United States Patent
Strunk

(10) Patent No.: US 10,281,071 B2
(45) Date of Patent: May 7, 2019

(54) BUSHINGS AND FITTINGS, TUBING ASSEMBLIES, AND METHODS INCORPORATING THE SAME

(71) Applicant: Titeflex Corporation, Springfield, MA (US)

(72) Inventor: Jordan Strunk, Portland, TN (US)

(73) Assignee: Titeflex Corporation, Springfield, MA (US)

( * ) Notice: Subject to any disclaimer, the term of this patent is extended or adjusted under 35 U.S.C. 154(b) by 275 days.

(21) Appl. No.: 15/363,217

(22) Filed: Nov. 29, 2016

(65) Prior Publication Data

US 2017/0159858 A1    Jun. 8, 2017

Related U.S. Application Data

(60) Provisional application No. 62/261,940, filed on Dec. 2, 2015.

(51) Int. Cl.
*F16L 11/11* (2006.01)
*F16L 25/00* (2006.01)
*F16L 19/04* (2006.01)

(52) U.S. Cl.
CPC ........... *F16L 25/0054* (2013.01); *F16L 11/11* (2013.01); *F16L 19/041* (2013.01)

(58) Field of Classification Search
CPC ........ F16L 11/11; F16L 19/061; F16L 19/065; F16L 19/00; F16L 25/0036
USPC .......................................... 285/903, 342, 343
See application file for complete search history.

(56) References Cited

U.S. PATENT DOCUMENTS

| 3,403,929 | A |   | 10/1968 | Russell |
| 4,063,757 | A | * | 12/1977 | Fuhrmann .............. F16L 33/01 285/903 |
| 4,368,904 | A |   | 1/1983  | Lanz |

(Continued)

FOREIGN PATENT DOCUMENTS

| EP | 3015752 A1     | 5/2016 |
| WO | WO 2016073196 A1 | 5/2016 |

OTHER PUBLICATIONS

Newloc Acetal, Plastic Push-to-Connect Fittings, New Age Industries, Fluid Transfer Specialists, www.newageindustries.com, Jul. 2014.

(Continued)

*Primary Examiner* — David Bochna
(74) *Attorney, Agent, or Firm* — Saul Ewing Arnstein & Lehr LLP; Brian R. Landry

(57) ABSTRACT

One aspect of the invention provides a bushing including: a plurality of rigid members defining one or more internal ribs including a first internal rib adapted and configured to engage a corrugation valley of corrugated tubing; and one or more elastic members adapted and configured to: hold the plurality of rigid members in substantially annular configuration; allow the plurality of rigid members to expand to allow a corrugation peak to pass under the first internal rib; and hold the plurality of rigid members against the corrugated tubing so that the first internal rib lies within a corrugation valley. Another aspect of the invention provides a fitting including: a body member defining a sleeve portion; and a bushing as described herein received within the sleeve portion of the body member.

18 Claims, 12 Drawing Sheets

(56) References Cited

U.S. PATENT DOCUMENTS

| | | | | |
|---|---|---|---|---|
| 4,437,691 | A * | 3/1984 | Laney | F16L 25/0036 285/903 |
| 4,538,842 | A | 9/1985 | Kowal et al. | |
| 4,801,158 | A * | 1/1989 | Gomi | F16L 25/0036 285/903 |
| 5,267,877 | A * | 12/1993 | Scannelli | F16L 25/0036 439/584 |
| 5,584,513 | A | 12/1996 | Sweeney | |
| 6,019,399 | A | 2/2000 | Sweeney | |
| 6,209,929 | B1 * | 4/2001 | Ikegami | F16L 5/06 285/903 |
| 6,428,052 | B1 | 8/2002 | Albino et al. | |
| 6,435,567 | B2 * | 8/2002 | Kikumori | F16L 25/0036 285/903 |
| 6,908,114 | B2 | 6/2005 | Moner | |
| 7,104,573 | B2 * | 9/2006 | Copeland | F16L 21/04 285/342 |
| 7,350,828 | B2 | 4/2008 | Williams | |
| 7,607,700 | B2 | 10/2009 | Duquette et al. | |
| 7,621,567 | B2 | 11/2009 | Duquette et al. | |
| 7,690,693 | B2 | 4/2010 | Moner et al. | |
| 7,857,358 | B2 | 12/2010 | Rolland et al. | |
| 8,235,427 | B2 * | 8/2012 | Jones | F16L 37/0845 285/343 |
| 2003/0193190 | A1 | 10/2003 | Werth | |
| 2006/0006651 | A1 * | 1/2006 | Watanabe | F16L 25/0036 285/903 |
| 2011/0041944 | A1 * | 2/2011 | Duquette | F16L 19/041 138/140 |
| 2013/0192708 | A1 | 8/2013 | Strunk | |
| 2014/0333066 | A1 * | 11/2014 | Strunk | F16L 19/00 285/374 |
| 2014/0373694 | A1 | 12/2014 | Strunk | |
| 2016/0123506 | A1 | 5/2016 | Strunk | |

OTHER PUBLICATIONS

Newman Tools Inc., Jacobs Rubber-flex collets, http://www.newmantools.com/jacobs/collets.htm, Oct. 2015.
OmegaFlex-AutoSnap, Snap-on Fitting for TracPipe CounterStrike, 2014.

* cited by examiner

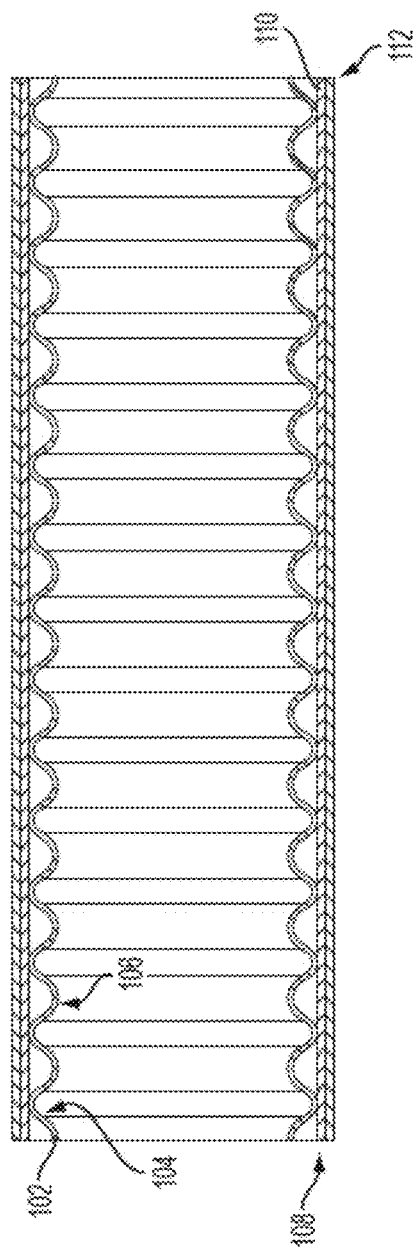
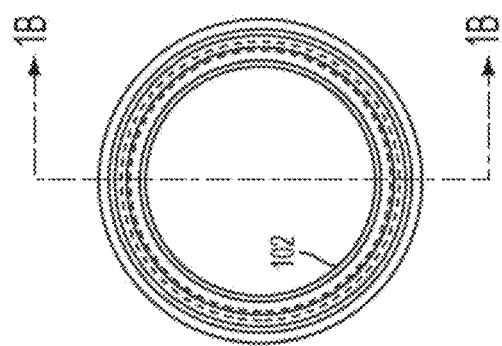

BUSHINGS AND FITTINGS, TUBING ASSEMBLIES, AND METHODS INCORPORATING THE SAME

CROSS-REFERENCE TO RELATED APPLICATION

This application claims priority under 35 U.S.C. § 119(e) to U.S. Provisional Patent Application Ser. No. 62/261,940, filed Dec. 2, 2015. The entire content of this application is hereby incorporated by reference herein.

BACKGROUND OF THE INVENTION

Gas and liquid piping systems utilizing corrugated stainless steel tubing ("CSST") and fittings are known. Such piping systems can be designed for use in combination with elevated pressures of up to about 25 psi or more and provide advantages over traditional rigid black iron piping systems in terms of ease and speed of installation, elimination of onsite measuring, and reduction in the need for certain fittings such as elbows, tees, and couplings.

SUMMARY OF THE INVENTION

One aspect of the invention provides a bushing including: a plurality of rigid members defining one or more internal ribs including a first internal rib adapted and configured to engage a corrugation valley of corrugated tubing; and one or more elastic members adapted and configured to: hold the plurality of rigid members in substantially annular configuration; allow the plurality of rigid members to expand to allow a corrugation peak to pass under the first internal rib; and hold the plurality of rigid members against the corrugated tubing so that the first internal rib lies within a corrugation valley.

This aspect of the invention can have a variety of embodiments. The plurality of rigid members can further define a second internal rib adapted and configured to press against a conductive layer surrounding the corrugated tubing, wherein the second annular internal protrusion has a rounded, substantially non-piercing profile. The second annular internal rib is spaced along the bushing such that the second annular internal rib aligns with other corrugation grooves of the corrugated tubing. The bushing can further include a third annular rib adapted and configured to press against an external jacket surrounding the conductive layer.

The plurality of rigid members can be fabricated from a conductive material. The conductive material can be metal. The metal can be selected from the group consisting of: aluminum, gold, iron, silver, zinc, copper, tin, and an alloy thereof.

The one or more elastic members can be fabricated from a material selected from the group consisting of: thermoplastic elastomer, silicone, and rubber.

Another aspect of the invention provides a fitting including: a body member defining a sleeve portion; and a bushing as described herein received within the sleeve portion of the body member.

Another aspect of the invention provides a tubing assembly comprising: a length of corrugated tubing; and a fitting as described herein engaged with the length of corrugated tubing.

Another aspect of the invention provides a method for installing energy dissipative tubing. The method includes: providing a length of corrugated tubing; providing a fitting as described herein; and pushing one end of the length of corrugated tubing into the bushing such that the first internal rib engages a corrugation groove.

Another aspect of the invention provides a bushing including: a plurality of rigid members defining: a first internal rib adapted and configured to engage a corrugation valley of corrugated tubing, a second internal rib adapted and configured to press against a conductive layer surrounding the corrugated tubing, wherein the second internal protrusion has a rounded, substantially non-piercing profile, and a third annular rib adapted and configured to press against an external jacket surrounding the conductive layer; and one or more elastic members adapted and configured to: hold the plurality of rigid members in a substantially annular configuration; allow the plurality of rigid members to expand to allow one or more corrugation peaks to pass under the first internal rib, the second internal rib, and the third internal rib; and hold the plurality of rigid members against the corrugated tubing so that: the first internal rib lies within a corrugation valley; the second internal rib presses against the conductive layer surrounding the corrugated tubing; and the third annular rib presses against an external jacket surrounding the conductive layer.

This aspect of the invention can have a variety of embodiments. The plurality of rigid members can be fabricated from a conductive material. The one or more elastic members is fabricated from a material selected from the group consisting of: thermoplastic elastomer, silicone, and rubber.

Another aspect of the invention provides a bushing including: a plurality of rigid members defining one or more internal ribs including a first internal rib adapted and configured to engage a corrugation valley of corrugated tubing; and one or more elastic members adapted and configured to: hold the plurality of rigid members in substantially annular configuration; hold the plurality of rigid members at a radial distance sufficient to allow a corrugation peak to pass under the first internal rib; and deform to allow the plurality of rigid members engage against the corrugated tubing so that the first internal rib lies within a corrugation valley following mechanical compression.

This aspect of the invention can have a variety of embodiments. The plurality of rigid members can be fabricated from a conductive material. The one or more elastic members can be fabricated from a material selected from the group consisting of: thermoplastic elastomer, silicone, and rubber.

The plurality of rigid members can further define a second internal rib adapted and configured to press against a conductive layer surrounding the corrugated tubing, wherein the second annular internal protrusion has a rounded, substantially non-piercing profile. The second annular internal rib can be spaced along the bushing such that the second annular internal rib aligns with other corrugation grooves of the corrugated tubing. The bushing can further include a third annular rib adapted and configured to press against an external jacket surrounding the conductive layer.

Another aspect of the invention provides a bushing including: a plurality of rigid members defining one or more internal ribs including a first internal rib adapted and configured to engage a corrugation valley of corrugated tubing; and one or more elastic members adapted and configured to: hold the plurality of rigid members in substantially annular configuration; allow the plurality of rigid members to expand to allow a corrugation peak to pass under the first internal rib; and hold the plurality of rigid members against the corrugated tubing so that the first internal rib lies within a corrugation valley.

Another aspect of the invention provides a bushing including: a plurality of rigid members defining one or more internal ribs including a first internal rib adapted and configured to engage a corrugation valley of corrugated tubing; and one or more elastic members adapted and configured to: hold the plurality of rigid members in substantially annular configuration; hold the plurality of rigid members at a radial distance sufficient to allow a corrugation peak to pass under the first internal rib; and hold the plurality of rigid members against the corrugated tubing so that the first internal rib lies within a corrugation valley following mechanical compression.

These aspects can have a variety of embodiments. The plurality of rigid members can further define a second internal rib adapted and configured to press against a conductive layer surrounding the corrugated tubing. The second annular internal protrusion can have a rounded, substantially non-piercing profile. The second annular internal rib can be spaced along the bushing such that the second annular internal rib aligns with other corrugation grooves of the corrugated tubing. The bushing can further include a third annular rib adapted and configured to press against an external jacket surrounding the conductive layer.

The plurality of rigid members can be fabricated from a conductive material. The conductive material can be metal. The metal can be selected from the group consisting of: aluminum, gold, iron, silver, zinc, copper, tin, and an alloy thereof.

The one or more elastic members can be fabricated from a material selected from the group consisting of: thermoplastic elastomer, silicone, and rubber.

Another aspect of the invention provides a bushing including: a plurality of rigid members and one or more elastic members. The plurality of rigid members define: a first internal rib adapted and configured to engage a corrugation valley of corrugated tubing, a second internal rib adapted and configured to press against a conductive layer surrounding the corrugated tubing, wherein the second internal protrusion has a rounded, substantially non-piercing profile, and a third annular rib adapted and configured to press against an external jacket surrounding the conductive layer. The one or more elastic members are adapted and configured to: hold the plurality of rigid members in a substantially annular configuration; allow the plurality of rigid members to expand to allow one or more corrugation peaks to pass under the first internal rib, the second internal rib, and the third internal rib; and hold the plurality of rigid members against the corrugated tubing so that: the first internal rib lies within a corrugation valley; the second internal rib presses against the conductive layer surrounding the corrugated tubing; and the third annular rib presses against an external jacket surrounding the conductive layer.

Another aspect of the invention provides a fitting including: a body member defining a sleeve portion; and the bushing as described herein received within the sleeve portion of the body member.

This aspect of the invention can have a variety of embodiments. The bushing can further include a second internal rib adapted and configured to press against a conductive layer surrounding the corrugated tubing. The second annular internal protrusion can have a rounded, substantially non-piercing profile.

The fitting can further include a nut adapted and configured for threaded coupling with the body member. The bushing and the nut can be dimensioned such that as the nut is tightened, the second annular internal rib is compressed against the conductive layer.

The body member can include a first sealing surface and the bushing can include a second sealing surface for engaging the first sealing surface with at least one corrugation of the corrugated tubing received between the first and second sealing surfaces. A plurality of ridges can be formed on at least one of the first and second sealing surfaces, such that the ridges contact at least one corrugation to form a seal. The plurality of ridges can include an end ridge and at least first and second internal ridges arranged in order radially outward. The at least first and second internal ridges can be spaced apart from the end ridge. A distance between the end ridge and the first internal ridge can be greater than a distance between the first internal ridge and a second internal ridge to provide concentrated sealing pressure and prevent unfolding of the at least one corrugation.

Another aspect of the invention provides a tubing assembly including: a length of corrugated tubing; and the fitting as described herein engaged with the length of corrugated tubing.

This aspect of the invention can have a variety of embodiments. The corrugated tubing can be corrugated stainless steel tubing.

Another aspect of the invention provides a method for installing energy dissipative tubing. The method includes: providing a length of corrugated tubing; providing a fitting as described herein; and pushing one end of the length of corrugated tubing into the bushing such that the first internal rib engages a corrugation groove.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views.

FIGS. 1A and 1B depict a multi-layer jacketed tube in accordance with the prior art.

DEFINITIONS

Figure 2B:
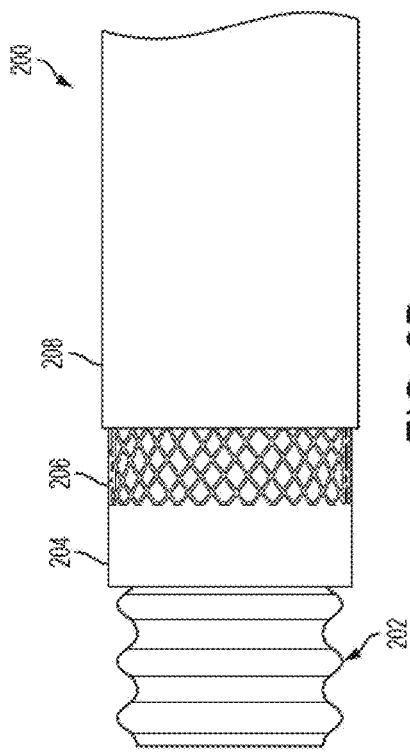
FIGS. 2A-2D depict an energy dissipative tube in accordance with the prior art.
Figure 2D:
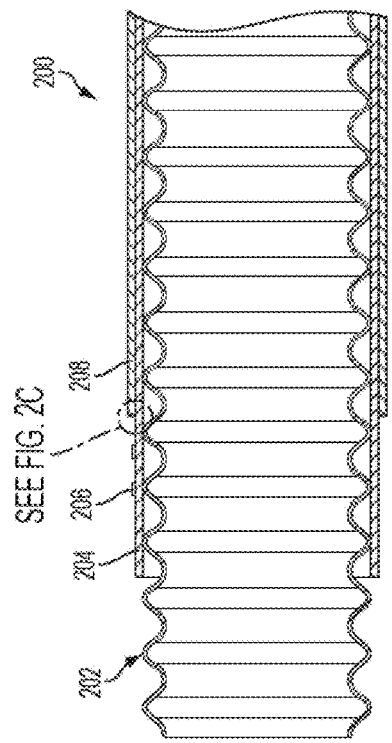
Figure 2A:
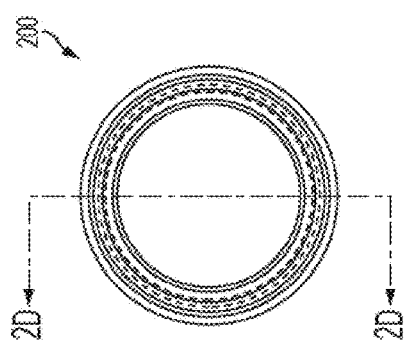
Figure 2C:
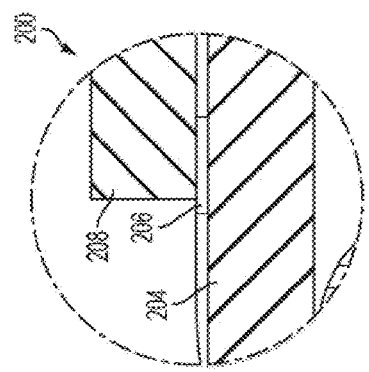

The instant invention is most clearly understood with reference to the following definitions.

As used herein, the singular form "a," "an," and "the" include plural references unless the context clearly dictates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

As used herein, the term "alloy" refers to a homogenous mixture or metallic solid solution composed of two or more elements. Examples of alloys include austenitic nickel-chromium-based superalloys, brass, bronze, steel, low carbon steel, phosphor bronze, stainless steel, and the like.

As used in the specification and claims, the terms "comprises," "comprising," "containing," "having," and the like can have the meaning ascribed to them in U.S. patent law and can mean "includes," "including," and the like.

As used herein, the terms "corrugated stainless steel tubing" and "CSST" refer to any type of semi-flexible tubing or piping that can accommodate corrosive or aggressive gases or liquids. In some embodiments, CSST is designed and/or approved for conveyance of fuel gases such as natural gas, methane, propane, and the like. For example, CSST can comply with a standard such as the ANSI LC 1-2005/CSA 6.26-2005 Standard for Fuel Gas Piping Systems Using Corrugated Stainless Steel Tubing. The inventions described herein can be utilized in conjunction with all commercially available CSST products including, but not limited to CSST sold under the GASTITE® and FLASHSHIELD® brands by Titeflex Corporation of Portland, Tenn.; the TRACPIPE® and COUNTERSTRIKE® brands by OmegaFlex, Inc. of Exton, Pa.; the WARDFLEX® brand by Ward Manufacturing of Blossburg, Pa.; the PRO-FLEX® brand by Tru-Flex Metal Hose Corp. of Hillsboro, Ind.; and the DIAMOND-BACK™ brand by Metal Fab, Inc. of Wichita, Kans.

Unless specifically stated or obvious from context, the term "or," as used herein, is understood to be inclusive.

As used herein, the term "metal" refers to any chemical element (or compound or alloy thereof) that is a good conductor of electricity and/or heat. Examples of metals include, but are not limited to, aluminum, cadmium, niobium (also known as "columbium"), copper, tin, gold, iron, nickel, platinum, silver, tantalum, titanium, zinc, zirconium, and the like.

As used herein, the term "resin" refers to any synthetic or naturally occurring polymer.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (as well as fractions thereof unless the context clearly dictates otherwise).

DETAILED DESCRIPTION OF THE INVENTION

Aspects of the invention provide elastomeric bushings and fittings, systems, and methods incorporating the same. The elastomeric bushings advantageously retain all bushing components as a single unit and enable fitting installation without the need for disassembly or reassembly, thereby reducing installation time.

Corrugated Tubing

Referring to FIGS. 1A and 1B, a length of corrugated tubing 102 according to the prior art is provided. The corrugated tubing 102 may be composed of stainless steel or any other suitable material. The tubing 102 contains a number of corrugation peaks 104 and corrugation valleys 106. A jacket 108 (e.g., a multi-layer jacket) covers the outside of the tubing 102.

The jacket 108 can include a plurality of layers 110, 112. The layers 110, 112 generally form an annulus around the tubing 102, but may have a circular or non-circular cross-section.

Energy Dissipative Tubing

Referring now to FIGS. 2A-2D, in order to better absorb energy from fault currents and direct or indirect lightning strikes, energy dissipative jackets are provided that dissipate electrical and thermal energy throughout the respective jackets, thereby protecting the tubing 202. The term "dissipate" encompasses distributing electrical energy to an appropriate grounding device such as a fitting.

Preferred embodiments of energy dissipative jackets preferably include one or more conductive layers for distributing electricity and heat. The conductive layers can include, for example, conductive resins and/or metals as discussed herein.

One embodiment of energy dissipative tubing 200 is depicted in FIGS. 2A-2D. The energy dissipative tubing 200 includes a length of tubing 202. The tubing 202 can be metal tubing, thin-walled metal tubing, corrugated tubing, corrugated stainless steel tubing, or the like.

Tubing 202 is surrounded by a first resin layer 204, a metal layer 206, and a second resin layer 208. Resin layers 204, 208 can be formed from insulative and/or conductive resins.

Insulating resin layers can be formed from a variety of materials. In some embodiments, an insulating elastic layer includes polytetrafluoroethylene (PTFE). Other suitable insulators include polyolefin compounds, thermoplastic polymers, thermoset polymers, polymer compounds, polyethylene, crosslinked polyethylene, UV-resistant polyethylene, ethylene-propylene rubber, silicone rubber, polyvinyl chloride (PVC), ethylene tetrafluoroethylene (ETFE), and ethylene propylene diene monomer (EPDM) rubber.

Conductive resin layers can be formed by impregnating a resin with conductive material such as metal particles (e.g., copper, aluminum, gold, silver, nickel, and the like), carbon black, carbon fibers, or other conductive additives. In some embodiments, the metal layer 206 and/or one or more of the resin layers 204, 208 has a higher electrical conductivity than the tubing 202. In some embodiments, the volume resistivity of the conductive resin can be less than about $10^6$ ohm-cm (e.g., $9 \times 10^6$ ohm-cm) as tested in accordance with ASTM standard D257.

In some embodiments, each resin layer 204, 208 has a thickness of about 0.015" to about 0.035".

Metal layer 206 can include one or more metals (e.g., ductile metals) and alloys thereof. The metal(s) can be formed into foils, perforated foils, tapes, perforated tapes, cables, wires, strands, meshes, braids, and the like.

In some embodiments, the metal layer 206 is an expanded metal foil as further described in U.S. Patent Application Publication No. 2011-0041944. A variety of expanded metal foils are available from the Dexmet Corporation of Wallingford, Conn. An exemplary embodiment of energy dissipative tubing 200 with expanded metal foil is depicted in FIGS. 2A-2D.

In some embodiments, the metal layer 206 completely surrounds the first resin layer 204. In such embodiments, the metal may overlap and/or be welded or soldered in some regions. In other embodiments, the metal layer 206 substantially surrounds the first resin layer 204. In such embodiments, a small portion of the first resin layer 204 (e.g., less than about 1°, less than about 2°, less than about 3°, less than about 4°, less than about 5°, less than about 10°, less than about 15°, less than about 20°, and the like) is not surrounded by the metal layer 26. In still other embodiments, the metal layer 206 can be wrapped spirally or helically around the first resin layer 204. In such an embodiment, the metal layer 206 can overlap or substantially surround the first resin layer 204

In some embodiments, the metal layer 206 is a conventional, non-expanded metal foil, such as aluminum or copper foil that can, in some embodiments, completely envelop the inner resin layer 206.

Various thicknesses of the resin layers 204, 208 and the metal layer 206 can be selected to achieve desired resistance to lightning strikes and physical damage while maintaining desired levels of flexibility. In embodiments including an expanded metal foil, the mass per area can be adjusted to provide an appropriate amount of energy dissipation. The resin layers 204, 208 can be the same or different thickness and can include the same or different materials. Various colors or markings can be added to resin layers, for example, to clearly distinguish the resin layers 204, 208 from each other and from the metal layer 206 and/or to make the tubing 200 more conspicuous.

Sealing Devices

Referring now to FIGS. 3A-3D, a partial cross-sectional view of a sealing device 300 is provided. The sealing device 300 allows for the sealing and coupling of an end of tubing (not depicted) to a pipe, a manifold, an appliance, and the like (not depicted).

Bushing 304 is placed inside the sleeve portion 316 of the body member 302. After body member 302 is threaded onto a a desired component (not depicted), tubing 200 can be pushed into the bushing 304 within the sleeve portion 316 of the body member 302 and sealed by advancing a nut 306 as further discussed below.

Nut 306 can have internal or external threads to mate with body member 302. In some embodiments, nut 306 can include a torque-limiting feature as described in U.S. Patent Application Publication No. 2013-0087381.

Although the assembly 300 can be used with a variety of types of CSST, the bushing 304 is particularly advantageous when used with energy dissipative tubing 200 having one or more conductive layers 206 such as described and depicted in FIG. 2.

One embodiment of a bushing 404 is depicted in FIGS. 4A-4D. Bushing 404 includes a plurality of rigid members 424 defining one or more internal ribs 408, 410, 412. Internal ribs 408, 410, 412 can include a first internal rib 408 adapted and configured to engage a corrugation valley of corrugated tubing 202. Rigid members 424 can be fabricated from a conductive material, such as a metal using techniques such as casting, molding, machining, and the like. In some embodiments, the rigid members 424 can fabricated from a plurality of materials. For example, a proximal portion (e.g., the portion containing the first internal rib 408 and/or the second internal rib 410) can be fabricated from a metal and a distal portion (e.g., the portion containing the third internal rib 412 and/or the trailing lips 614) can be formed from an elastomer (e.g., an elastomer having sufficient stiffness to withstand axial movement while the CSST passes under the internal ribs 408, 410, and/or 412). The bushing and the nut can be sized such that advancement of the nut relative to the bushing compresses the trailing elastomeric region to form a seal against the jacket of the tubing.

Bushing 404 also includes one or more elastic members 426 adapted and configured to hold the rigid members 424 in a substantially annular configuration. Elastic members 426 allow the rigid members 424 to expand to allow a corrugation peak 104 to pass under the first internal rib 408 when corrugated tubing 202 is pushed into the bushing 404. Elastic members 426 also hold the rigid members against the corrugated tubing 202 so that the first internal rib 408 lies within a corrugation valley 106. Elastic members 426 may be fabricated from materials such as thermoplastic elastomer (TPE), silicone, or rubber.

In some embodiments, the rigid members 424 are bonded to the elastic members 426. In other embodiments, the rigid members 424 are coupled to the elastic members 426 through mechanical means such as overmolding of the elastic members 426 to engage with features of the rigid members 424. In still other embodiments, elastic rings best viewed in FIGS. 4A and 4C can retain rigid members 424 through inward compression.

Elastic members 426 can both resiliently stretch as the tubing is inserted and/or compress as the bushing 404 is advanced proximally within the sleeve portion 316.

Elastic members 426 can provide a suitable gasket between rigid members 424 to prevent entry of contaminants into the fitting assembly. In some embodiments, the bushing 404 and the sealing device is sized such that little or no stretching is required for insertion and the elastic members 426 are only engaged through compression during advancement of the nut. For example, the bushing 404 can be held in an appropriate location axially such that the internal ribs 408, 410, 412 are proximal to their desired engagement points when the tubing is inserted and rests against a sealing face of the sealing device. As the nut is advanced, the bushing 404 can tighten, engage one or more corrugations, and drive the tubing to collapse one or more corrugations to form a gastight seal.

In one embodiment, the first internal rib 408, 308 engages the first corrugation valley 106 of the tubing to facilitate the sealing of the tubing 202 against the body member 302. As the nut 306 is advanced, the first internal rib 408, 308 of the bushing 404, 304 presses the tubing 202 against the sealing face of the body member 302, causing the first corrugation peak 104 to collapse and form a gastight seal.

Figure 3A:
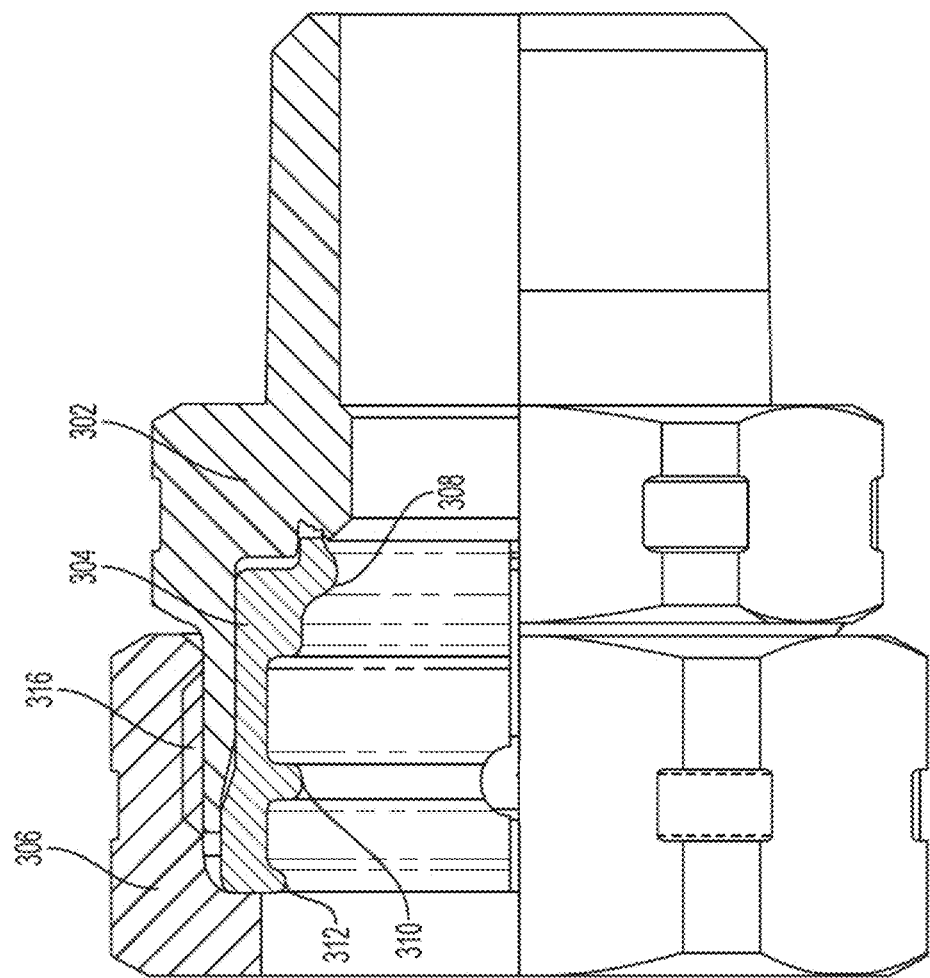
FIGS. 3A-3D depict a sealing device and tubing assembly according to an embodiment of the invention.
Figure 3B:
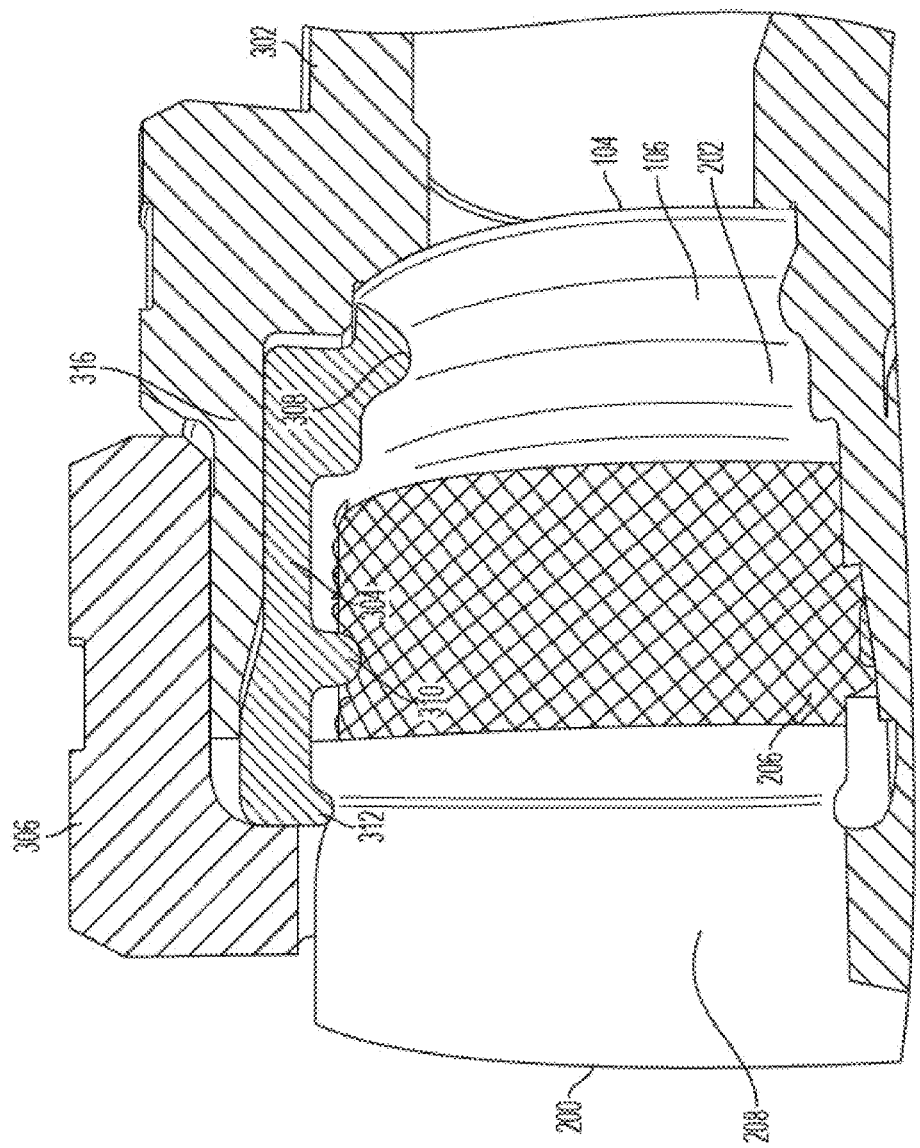
Figure 3C:
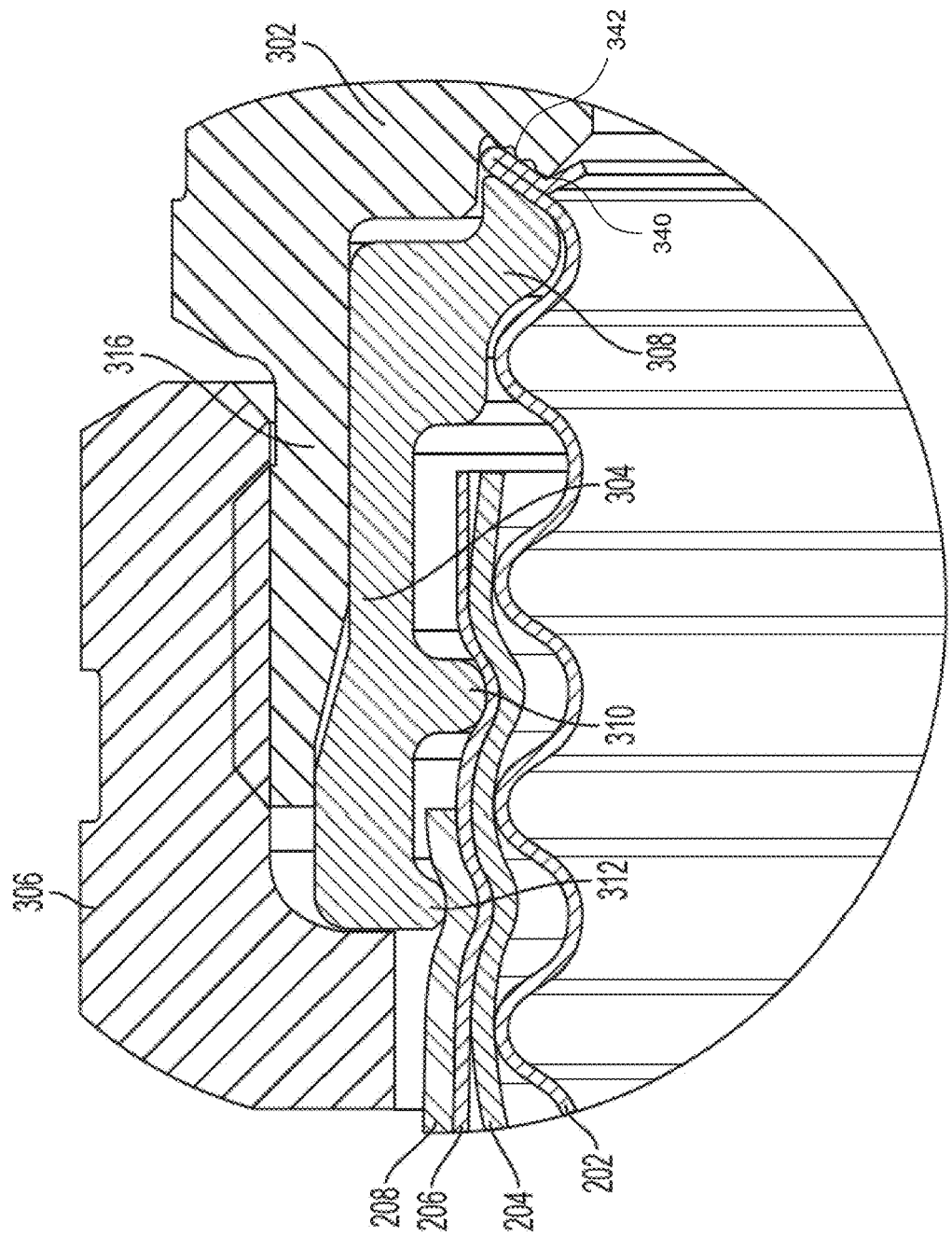
Figure 3D:
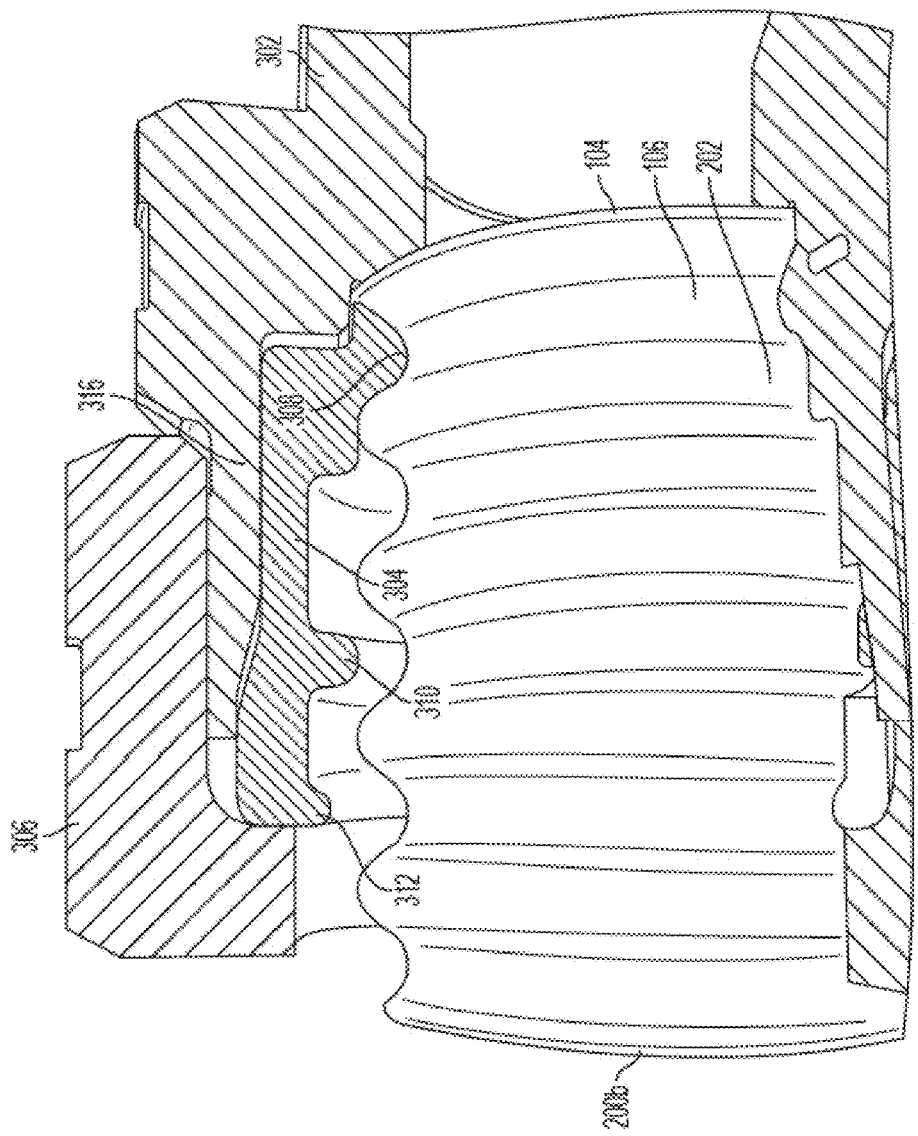
Figure 4A:
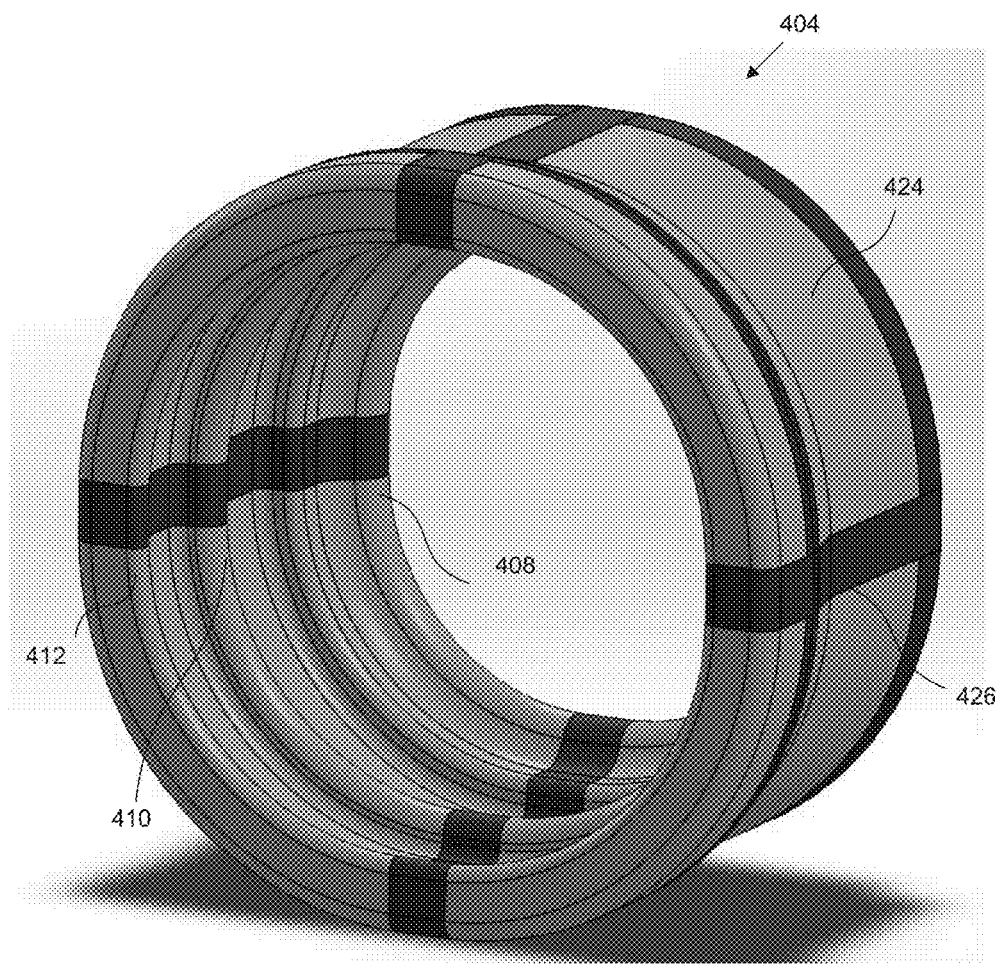
FIGS. 4A-4B depict a bushing according to an embodiment of the invention.
Figure 4B:
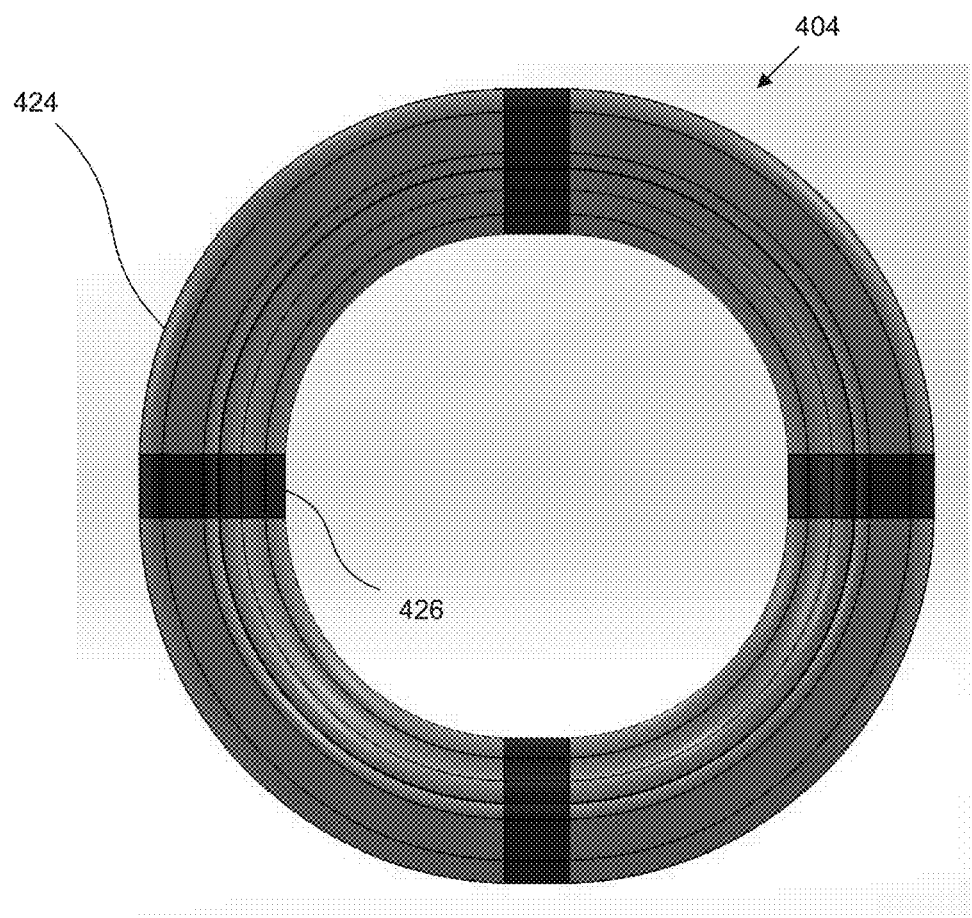
Figure 4C:
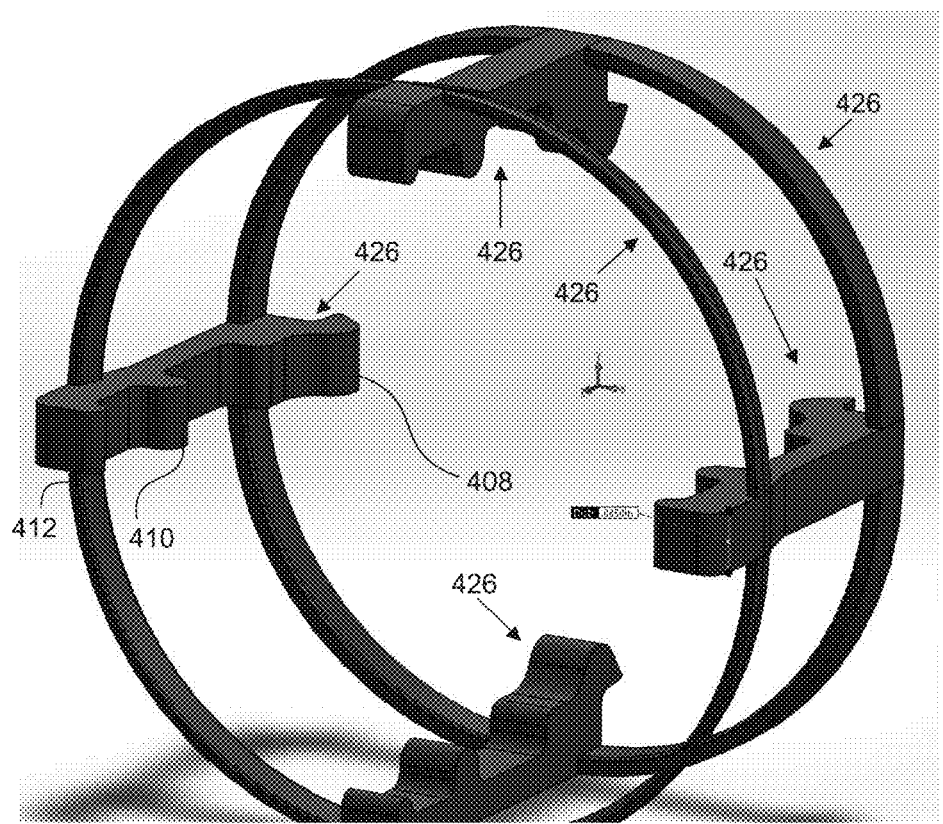
FIG. 4C depicts elastomeric members of the bushing shown in FIGS. 4A-4B.
Figure 4D:
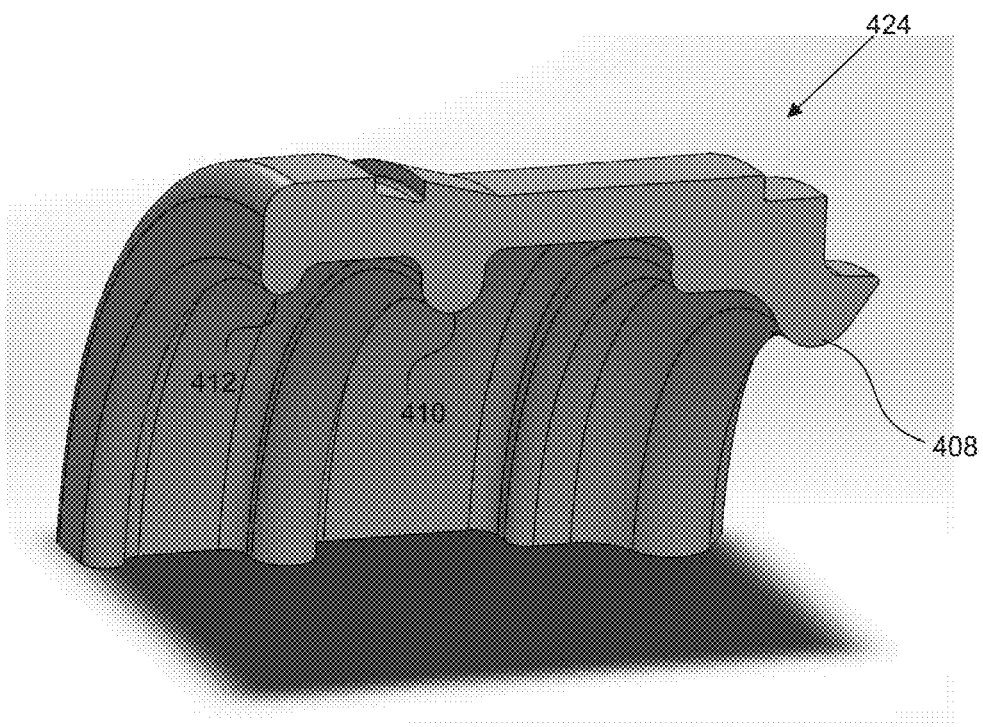
FIG. 4D depicts a rigid member of the bushing shown in FIGS. 4A-4B.

Referring to FIG. 3C, body member 302 can include a sealing face having one or more sealing circular ridges adapted and configured to facilitate a metal-to-metal gastight seal. In some embodiments, body member 302 includes a first sealing surface and the bushing includes a second sealing surface for engaging the first sealing surface with at least one corrugation of the corrugated tubing 202 received between the first and second sealing surfaces. A plurality of ridges 340, 342 can be formed on at least one of the first and second sealing surfaces, such that the ridges 340, 342 contact at least one corrugation to form a seal. The plurality of ridges 340, 342 can include an end ridge 340 and at least first and second internal ridges 342 arranged in order radially outward. The at least first and second internal ridges 342 can be spaced apart from the end ridge 340. A distance between the end ridge 340 and the first internal ridge 342 can be greater than a distance between the first internal ridge 342 and a second internal ridge 342 to provide concentrated sealing pressure and prevent unfolding of the at least one corrugation. Such a sealing architecture is described in U.S. Pat. Nos. 7,607,700 and 7,621,567 and embodied in the XR3 fitting available from Titeflex Corporation of Portland, Tenn.

Bushing 304, 404 can also include a second annular internal rib 310, 410. Second annular internal rib 310, 410 can be adapted and configured to press against and form electrical continuity with conductive layer 206 so that electricity received in the conductive layer 206 will flow through the second internal rib 310, 410 and bushing 304, 404. In order to facilitate as large of a contact area as possible between the conductive layer 206 and the second annular internal rib 310, 410 can have a rounded, substantially non-piercing profile.

Preferably, second annular internal rib 310, 410 is positioned along bushing 304, 404 with respect to the first internal rib 308, 408 such that when the first internal rib 308, 408 engages with a corrugation valley 106, the second annular internal rib 310, 410 will also be positioned over another corrugation valley 106 so that the second annular internal rib 310, 410 can press the conductive layer 206 (and any layers 204 below) into the corrugation valley 106 and create further contact between the second annular internal rib 310, 410 and the conductive layer 206.

Preferably, second annular internal rib 310, 410 can be located over the third corrugation valley 106 of the tubing (as seen in FIG. 3C), but may also be located at the second or fourth corrugation valley 106. Locating second annular internal rib 310, 410 over a corrugation valley 106 is favorable so as to prevent any direct contact with layers 204 or 206 and the corrugated tubing 202 beneath when the bushing 304 is assembled onto the tubing. Direct contact between these layers 204, 206 and the tubing 202 due to the compression from bushing 304 may result in undesired mechanical interference that leads to difficult assembly or decreased performance or longevity.

In order to maximize the contact area and steadfastness of the connection between the second annular internal rib 310, 410 and the conductive layer 206, the second annular internal rib 310, 410 can be designed to have certain dimensions relative to dimensions of tubing 200.

Generally, the internal diameter of the second annular internal rib 310, 410 will often be less than the outer diameter of the conductive layer 206 so that the second annular internal rib 410, 310 presses into and deforms conductive layer 206 and any layers 204 below. Although the difference between diameters may vary across various tubing sizes, the difference between the outer diameter of the conductive layer 206 and the inner diameter of the second internal rib 310, 410 can be between about 0% and about 1%, between about 1% and about 2%, between about 2% and about 3%, between about 3% and about 4%, between about 4% and about 5%, between about 5% and about 6%, between about 6% and about 7%, between about 7% and about 8%, between about 8% and about 9%, between about 9% and about 10%, and the like.

In one embodiment, the cross-sectional radius of second annular internal rib 310, 410 can be about 0.030". Such a sizing can advantageously apply both to fittings 300 for ½" CSST as well as to larger diameter CSST such as ¾", 1", 1¼", 1½", 2" and the like. In some embodiments, the radius may be larger to more closely approximate the larger corrugation valleys 106 on larger diameter tubing. However, it is believed that a radius of about 0.030" is sufficient for proper electrical grounding of tubing having diameters at least up to 2".

Second annular internal rib 310, 410 can have a minimum radius in order to prevent cutting or tearing of the conductive layer 206. It is believed that any cross-sectional radius greater than 0.005" is sufficient to prevent or substantially minimize cutting or tearing of the conductive layer 206.

Bushing 304, 404 can also include a third annular internal rib 312, 412 adapted and configured to press against an outer jacket 208 to prevent outer jacket 208 from withdrawing from the fitting 300 and to prevent foreign objects or substances from entering fitting 300. Like second annular internal rib 310, 410, third annular internal rib 312, 412 can be positioned with respect to the first annular rib 308, 408 such that the third annular internal rib 312, 412 presses the jacket 208 and any jacket layers below into a corrugation groove 106.

Third annular internal rib 312, 412 can preferably be located approximately one corrugation width from second annular internal rib 310, 410 but may also be located between about 0 and about 1 corrugation width or between about 1 and about 2 corrugation widths from rib 310, 410.

In some embodiments, the nut 306 can include a stop shoulder and an internal taper that narrows from a proximal end of the sealing device toward the distal end. Bushing 304 can include complimentary features including an external rib adapted and configured to be engaged by the stop shoulder of the nut 306 to drive the bushing 304 in the proximal direction within the sleeve portion 316 of the body member 302 as the nut 306 is threaded onto the body member 302.

Bushings 304, 404 can optionally include a trailing hinged portion that a pressed against one or more jacket layers as the nut 306 is advanced. Such an architecture is described in U.S. patent application Ser. No. 14/927,575.

Embodiments of the elastomeric bushings 304, 404 described enable installation of CSST without disassembly of the sealing device. In such an embodiment, the sleeve portion 316 and/or the nut 306 can have a suitable inner diameter at some point (typically toward a distal end of the sealing device 300) to allow for the elastomeric bushing 304, 404 to expand diametrically when the CSST is advanced through the bushing 304, 404.

Figure 6:
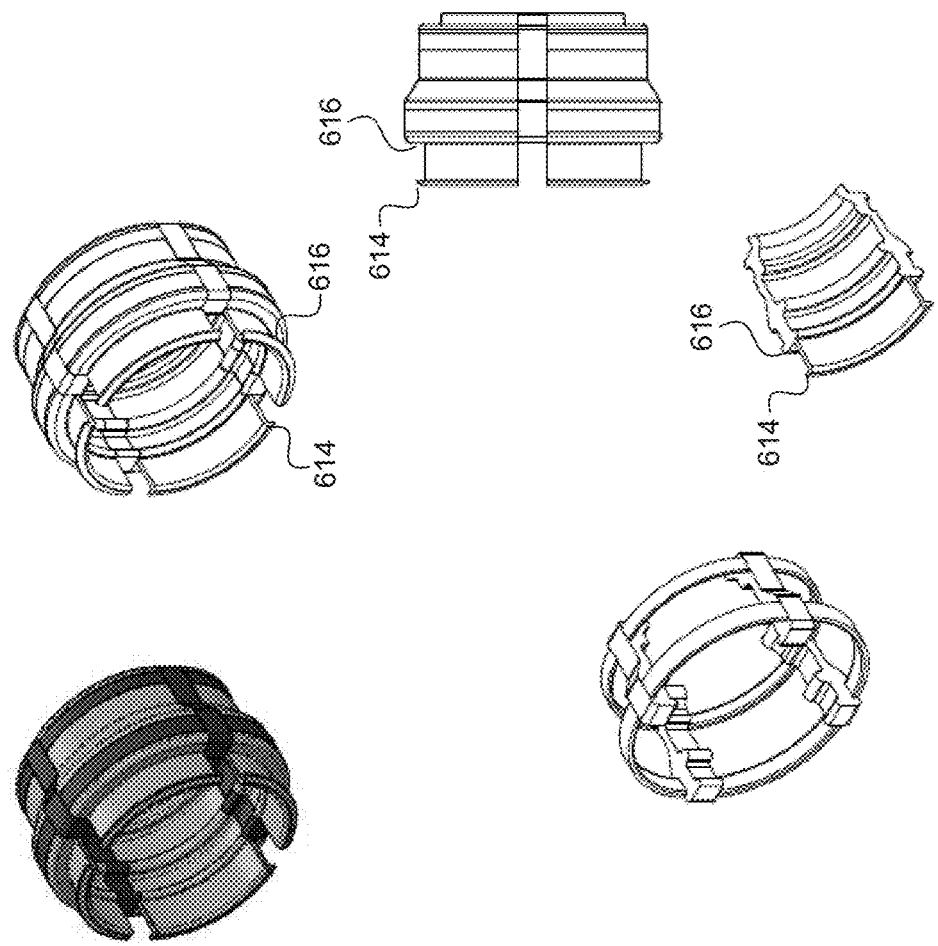
FIG. 6 depicts a bushing according to an embodiment of the invention.
Figure 7:
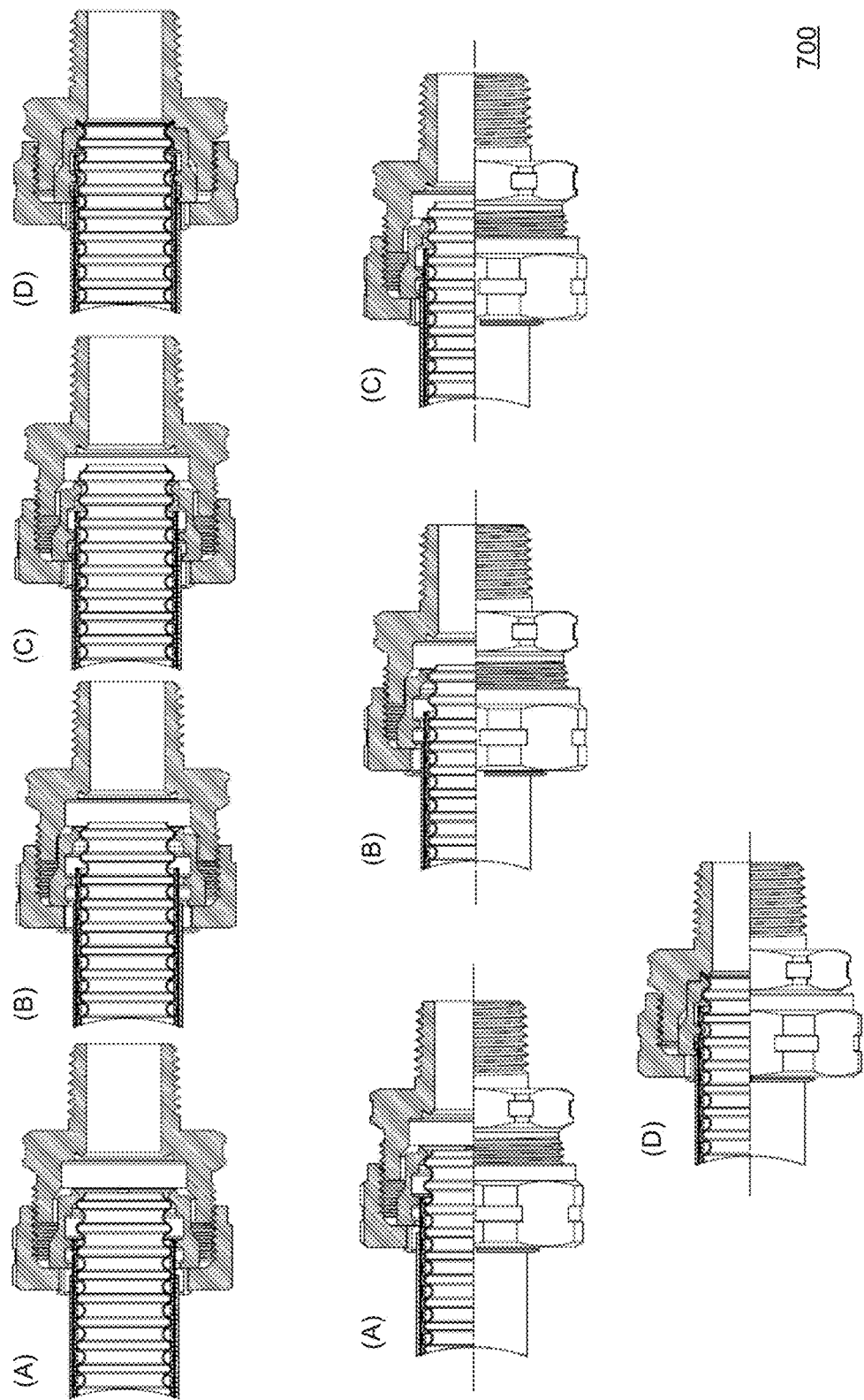
FIG. 7 depicts a sealing device according to an of the invention.

One embodiment of a bushing 604 and a sealing device 700 is depicted in FIGS. 6 and 7, respectively. Bushing 604 includes trailing lips 614 adapted and configured to extend through the central opening of the nut 606 and engage with the nut 306 to prevent the bushing 604 from moving axially while the tubing is advanced through the bushing 604. As the nut 306 is rotated, the bushing 604 can rotate freely from the nut 306 while the nut 306 axially drives the bushing 604 via shoulder 616.

FIG. 7 depicts the mechanism of action for embodiments of the invention.

At point (A), the sealing device 700 is provided in initial state, which can be the state provided at the point of sale. The bushing 604 can be engaged with the nut 306 by pushing trailing lips 614 through the central opening of the nut 306 so that the trailing lips 614 engage with the nut 306 to prevent axial movement of the bushing 604. Nut 306 is engaged with the body member 302 by threading (e.g., 1, 2, or 3 revolutions). Bushing 606 is held in a distal position in which the body member 302 does not prevent expansion of the bushing 606. The leading corrugation peak 104 of the tubing 200 approaches the first internal rib 308, which can have a narrower inner diameter in a resting state than the outer diameter of the tubing 200.

At point (B), the tubing 200 is further advanced. The elastic members 426 stretch to allow the leading corrugation peak 104 to pass under the first internal rib 308.

At point (C), the tubing 200 is further advanced. The elastic members 426 return the rigid members 424 to their resting state and the first internal rib 308 rests within the first corrugation valley 106.

At point (D), the nut 306 is rotated to axially advance the bushing 604. The bushing 604 is compressed within portions of the body member 302 having a narrower internal diameter. The elastic members 426 can compress to accommodate this compression. The leading corrugation 104 is pressed and collapsed between the sealing faces of the body member 302 and bushing 604 to form a gastight seal.

In another embodiment, the sleeve portion 316 can include one or more tabs extending inward at a distal end and adapted and configured to engage and prevent advancement of the bushing 304, 404 until the tubing is inserted through the bushing 304, 404 and the one or more annular ribs are appropriately seated. For example, the tabs can be sized to (i) withstand the axial forces required to stretch the elastomeric bushing 304, 404, but (ii) deform when greater axial forces are generated by advancement of the nut 306. In some embodiments, relief zones can be cast proximally downstream from the tabs so that the tabs can bend into relief zones and maintain a substantially smooth sleeve portion 316. In other embodiments, the deformed tabs sit proud of the inner diameter of the sleeve portion 316 and provide additional radial compression on the bushing 304, 404. In still other embodiments, the tabs are frangible and detach from the sleeve portion 316 when the nut is axially advanced. In yet another embodiment, a deformable element such as a spring, a gasket, or a washer sits within the sleeve portion 316 and prevents axial advancement of the bushing 304, 404 until the nut 306 is axially advanced.

Methods of Installing Tubing

Figure 5:
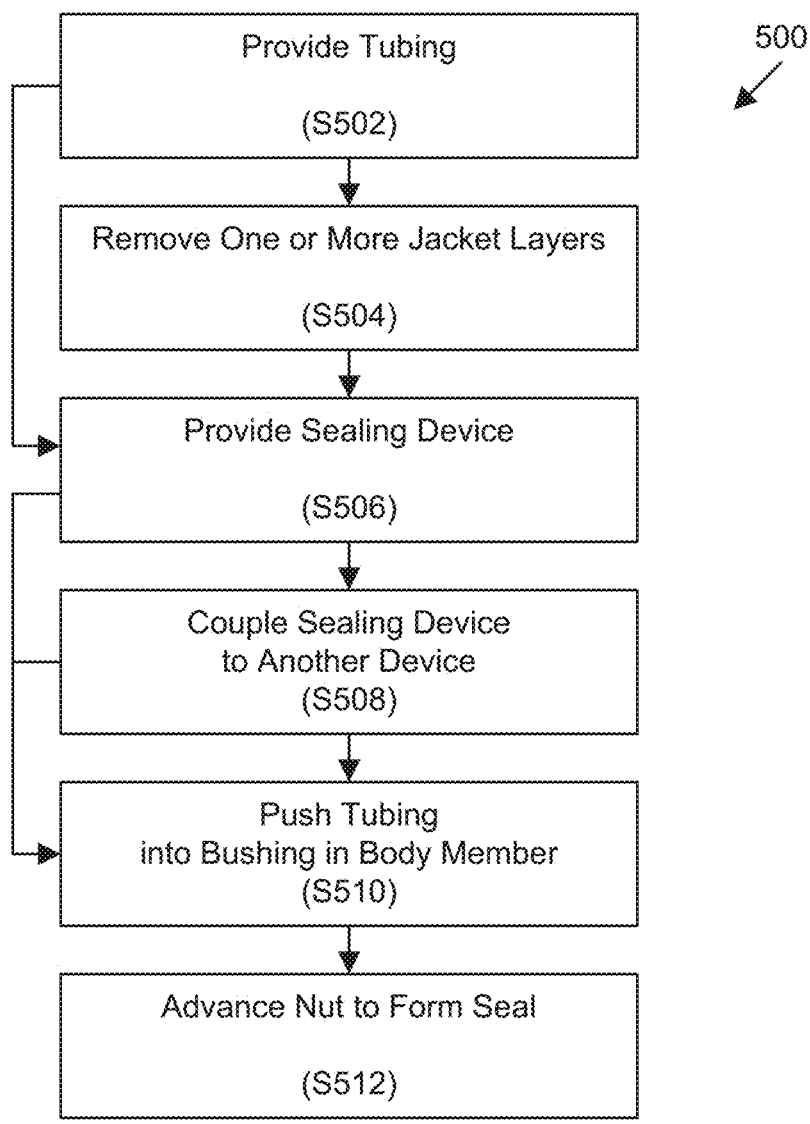
FIG. 5 depicts a method for installing energy dissipative tubing according to an embodiment of the invention.

An exemplary method 500 for installing energy dissipative tubing is depicted in FIG. 5.

In step S502, a length of tubing is provided. Tubing can, in some embodiments, be CSST such as unjacketed CSST, jacketed CSST, and energy-dissipative CSST. Tubing can be provided in lengths (e.g., 8' sticks) or on reels.

In step S504, one or more jacket layers are optionally removed in accordance with the instructions for a fitting. The one or more layers can be removed with existing tools such as a utility knife, a razor blade, a tubing cutter, a jacket-stripping tool, and the like. Exemplary jacket-stripping tools are described in U.S. Patent Application Publication No. 2014/0373694 and are available from Titeflex Corporation of Portland, Tenn. Preferably, all jacket layers are removed from a leading end of the tubing. For example, all jacket layers can be removed to expose at least the first two corrugation peaks. Additionally, one or more outer jacket layers can be further removed to expose the conductive layer in a region corresponding to the second, third, or fourth annular rib.

In step S506, a sealing device is provided including a body member defining a sleeve portion, a bushing, and a nut as described herein.

In step S508, the sealing device is optionally coupled to another device. For example, the sealing device can be coupled to a source of a fuel gas such as a pipe, a manifold, a meter, a gas main, a tank, and the like. In another example, the sealing device can be coupled to an appliance that consumes a fuel gas such as a stove, an oven, a grill, a furnace, a clothes dryer, a fire place, a generator, and the like. The sealing device can be coupled to the other device by threaded or other attachments. In some circumstances, pipe seal tape (e.g., polytetrafluoroethylene tape) or pipe seal compound (commonly referred to as "pipe dope") is utilized to facilitate a gastight seal between the sealing device and the other device.

In step S510, the tubing is pushed into the bushing within the sleeve portion of the body member. The tubing can be positioned within the bushing such that the first annular rib engages with a first complete corrugation groove, the second annular rib engages with a conductive layer, and a third annular rib engages with an outer jacket layer.

In step S512, a nut is advanced to form a seal. The nut can be advanced by rotating the nut with a wrench to engage threads in the sleeve portion of the body member.

EQUIVALENTS

Although preferred embodiments of the invention have been described using specific terms, such description is for illustrative purposes only, and it is to be understood that changes and variations may be made without departing from the spirit or scope of the following claims.

INCORPORATION BY REFERENCE

The entire contents of all patents, published patent applications, and other references cited herein are hereby expressly incorporated herein in their entireties by reference.

The invention claimed is:

1. A tubing assembly comprising:
   a length of corrugated tubing; and
   a fitting engaged with the length of corrugated tubing, the fitting comprising:
      a body member defining a sleeve portion; and
      a bushing received within the sleeve portion of the body member, the bushing comprising:
         a plurality of rigid members defining one or more internal ribs including a first internal rib adapted and configured to engage a corrugation valley of corrugated tubing; and
         one or more elastic members adapted and configured to:
            hold the plurality of rigid members in substantially annular configuration;
            allow the plurality of rigid members to expand to allow a corrugation peak to pass under the first internal rib; and
            hold the plurality of rigid members against the corrugated tubing so that the first internal rib lies within a corrugation valley.

2. The tubing assembly of claim 1, wherein the plurality of rigid members further define a second internal rib adapted and configured to press against a conductive layer surrounding the corrugated tubing, wherein the second internal rib has a rounded, substantially non-piercing profile.

3. The tubing assembly of claim 2, wherein the second annular internal rib is spaced along the bushing such that the second annular internal rib aligns with other corrugation grooves of the corrugated tubing.

4. The tubing assembly of claim 3, further comprising a third annular rib adapted and configured to press against an external jacket surrounding the conductive layer.

5. The tubing assembly of claim 1, wherein the plurality of rigid members are fabricated from a conductive material.

6. The tubing assembly of claim 5, wherein the conductive material is metal.

7. The tubing assembly of claim 6, wherein the metal is selected from the group consisting of: aluminum, gold, iron, silver, zinc, copper, tin, and an alloy thereof.

8. The tubing assembly of claim 1, wherein the one or more elastic members is fabricated from a material selected from the group consisting of: thermoplastic elastomer, silicone, and rubber.

9. A method for installing energy dissipative tubing, the method comprising:
   providing a length of corrugated tubing;
   providing a fitting comprising:
      a body member defining a sleeve portion; and a bushing received within the sleeve portion of the body member, the bushing comprising:
  a plurality of rigid members defining one or more internal ribs including a first internal rib adapted and configured to engage a corrugation valley of corrugated tubing; and
  one or more elastic members adapted and configured to:
    hold the plurality of rigid members in substantially annular configuration;
    allow the plurality of rigid members to expand to allow a corrugation peak to pass under the first internal rib; and
    hold the plurality of rigid members against the corrugated tubing so that the first internal rib lies within a corrugation valley; and
pushing one end of the length of corrugated tubing into the bushing such that the first internal rib engages a corrugation groove.

10. A tubing assembly comprising:
a length of corrugated tubing; and
a fitting engaged with the length of corrugated tubing, the fitting comprising:
  a body member defining a sleeve portion; and
  a bushing received within the sleeve portion of the body member, the bushing comprising:
    a plurality of rigid members defining:
      a first internal rib adapted and configured to engage a corrugation valley of corrugated tubing;
      a second internal rib adapted and configured to press against a conductive layer surrounding the corrugated tubing, wherein the second internal protrusion has a rounded, substantially non-piercing profile; and
      a third annular rib adapted and configured to press against an external jacket surrounding the conductive layer; and
    one or more elastic members adapted and configured to:
      hold the plurality of rigid members in a substantially annular configuration;
      allow the plurality of rigid members to expand to allow one or more corrugation peaks to pass under the first internal rib, the second internal rib, and the third internal rib; and
      hold the plurality of rigid members against the corrugated tubing so that:
        the first internal rib lies within a corrugation valley;
        the second internal rib presses against the conductive layer surrounding the corrugated tubing; and
        the third annular rib presses against an external jacket surrounding the conductive layer.

11. The tubing assembly of claim 10, wherein the plurality of rigid members are fabricated from a conductive material.

12. The tubing assembly of claim 10, wherein the one or more elastic members is fabricated from a material selected from the group consisting of: thermoplastic elastomer, silicone, and rubber.

13. A tubing assembly comprising:
a length of corrugated tubing; and
a fitting engaged with the length of corrugated tubing, the fitting comprising:
  a body member defining a sleeve portion; and
  a bushing received within the sleeve portion of the body member, the bushing comprising:
    a plurality of rigid members defining one or more internal ribs including a first internal rib adapted and configured to engage a corrugation valley of corrugated tubing; and
    one or more elastic members adapted and configured to:
      hold the plurality of rigid members in substantially annular configuration;
      hold the plurality of rigid members at a radial distance sufficient to allow a corrugation peak to pass under the first internal rib; and
      deform to allow the plurality of rigid members engage against the corrugated tubing so that the first internal rib lies within a corrugation valley following mechanical compression.

14. The tubing assembly of claim 13, wherein the plurality of rigid members are fabricated from a conductive material.

15. The tubing assembly of claim 13, wherein the one or more elastic members is fabricated from a material selected from the group consisting of: thermoplastic elastomer, silicone, and rubber.

16. The tubing assembly of claim 13, wherein the plurality of rigid members further define a second internal rib adapted and configured to press against a conductive layer surrounding the corrugated tubing, wherein the second internal rib has a rounded, substantially non-piercing profile.

17. The tubing assembly of claim 16, wherein the second annular internal rib is spaced along the bushing such that the second annular internal rib aligns with other corrugation grooves of the corrugated tubing.

18. The tubing assembly of claim 16, further comprising a third annular rib adapted and configured to press against an external jacket surrounding the conductive layer.

* * * * *